Feb. 4, 1947. E. B. McGREAL 2,415,257
MEASURING DEVICE
Filed May 30, 1944
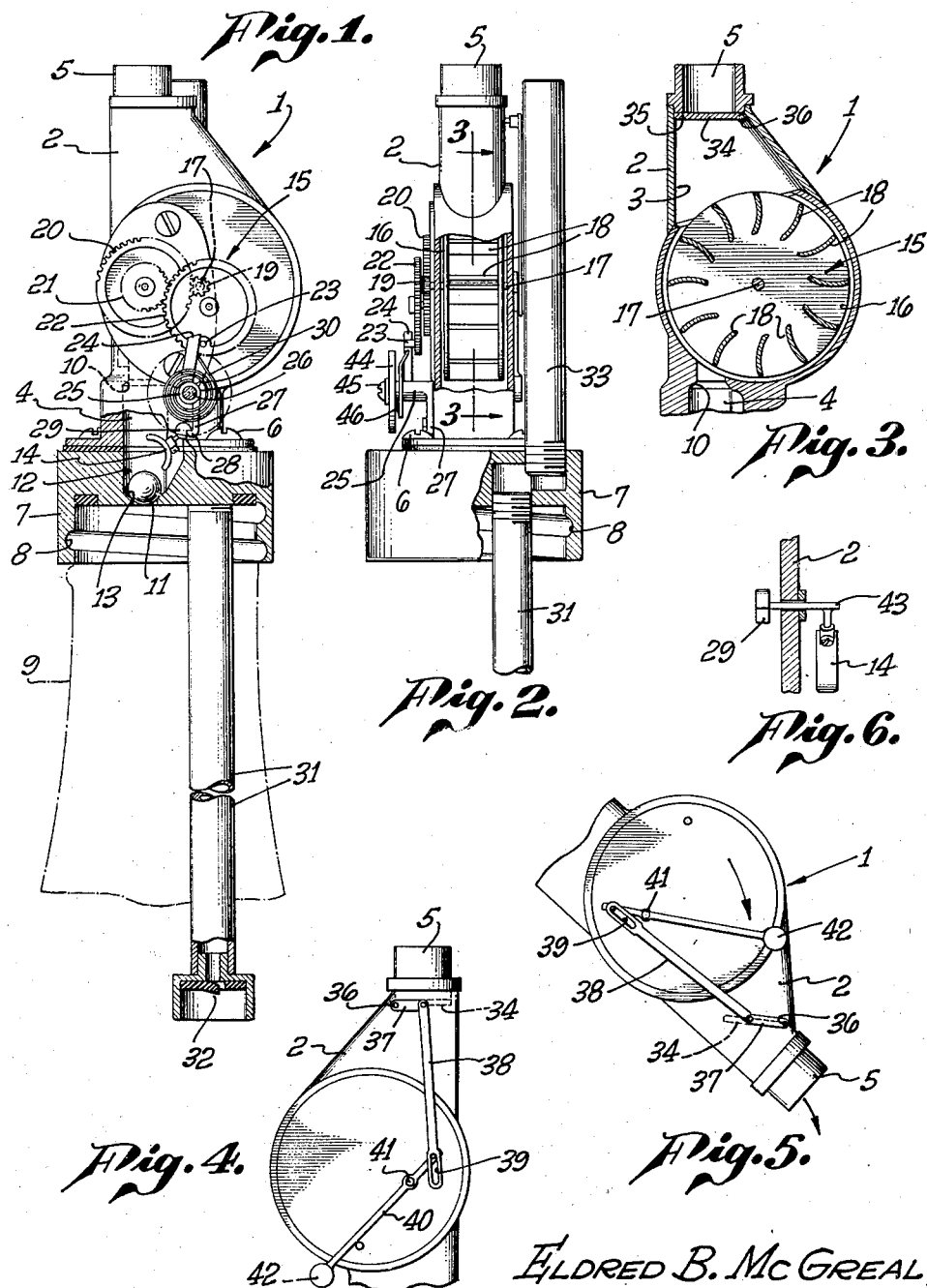
Eldred B. McGreal,
INVENTOR.
BY W E Beatty
ATTORNEY.

Patented Feb. 4, 1947

2,415,257

UNITED STATES PATENT OFFICE 2,415,257

MEASURING DEVICE

Eldred B. McGreal, Burbank, Calif.

Application May 30, 1944, Serial No. 538,057

8 Claims. (Cl. 222—477)

1

The invention relates to a measuring device and particularly to a device for delivering from a bottle or other container, a measured amount of liquid such as liquor.

An object of the invention is to provide a measuring device which is operable when the bottle is tilted to permit a given quantity of liquid to flow and then to cut off the flow.

Another object of the invention is to provide a measuring device in a removable spout which may be readily attached to a bottle or the like, with a gravity operated valve at the top end of the spout to prevent dust or dirt from entering the same when it is not in use, and with a second gravity operated valve in the throat or inlet of the spout to close the same when the container is upright, to seal off and prevent evaporation from the container.

Another object of the invention is to provide a spout having a measuring device therein which is operable when the spout is tilted, and to prevent flow from the spout until it is tilted to an angle steep enough to cause normal operation of the metering device, thereby preventing intentional faulty operation of the measuring device which faulty operation would be possible if the spout were tilted at a very slight angle to the horizontal, as this would permit liquid to flow past the metering device without operating it in the normal manner.

Another object of the invention is to provide a metering device operable by flow of liquid through a spout when the spout is tilted, the metering device returning to normal position when the container is moved to an upright position, whereby the container will deliver a measured quantity of liquid each time it is tilted, assuming that it is retained in a tilted position until the measured quantity is delivered.

For further details of the invention reference may be made to the drawing wherein Fig. 1 is a side view in elevation, partly in section, of a measuring device according to the present invention.

Fig. 2 is a front view in elevation, partly in section and with parts broken away of the device of Fig. 1.

Fig. 3 is a sectional view on line 3—3 of Fig. 2, looking in the direction of the arrows and with certain parts broken away.

Fig. 4 is a rear view in elevation of the device of Fig. 1 with certain parts broken away.

Fig. 5 is a rear view corresponding to Fig. 4, but with the spout in a tilted position, the outlet being shown in section.

2

Fig. 6 is a vertical sectional view parallel to the plane of Fig. 2, showing a detail of the fork member.

Referring in detail to the drawing, the measuring device 1 comprises a spout 2 having a passageway 3 therethrough and having a throat or inlet 4 and a discharge outlet 5. The spout 2 is suitably secured by means such as screws 6 to a base 7 having screw threads or other fastening means 8 to secure the spout in position on the neck of a bottle 9. The upper part of the throat or inlet 4 is provided with a valve seat 10 on which the ball valve 11 is adapted to seat when the spout is tilted. The throat 4 is continued into the base 7 as shown at 12 and is provided with a valve seat 13 on which the ball valve 11 is adapted to seat when the container 9 is upright as shown in Fig. 1.

In the throat 4 is arranged a fork 14 which is adapted to temporarily restrain the ball valve 11 from reaching its seat 10 when the spout is tilted. During the time of such restraining movement, liquid is discharged from the outlet 5 and after a measured quantity has been discharged, the valve 11 closes on its seat 10 to thereby prevent liquid from container 9 from being delivered to the metering device 15.

The metering device comprises a wheel 16 arranged in the spout 2 between the throat 4 and the outlet 5, and has an axle 17 arranged at one side of a straight line between the throat 4 and the outlet 5. The wheel 16 has an array of vanes 18 which cause rotation of the wheel 16 in a clockwise direction as seen in Fig. 3, when the liquid flows through the tilted spout. The axle 17 is journaled in the side walls of the spout 2 and outside of the spout is provided with a pinion 19 meshing with a gear 20 secured to a smaller gear 21, meshing with a larger gear 22. The gears 19 to 22 thus provide a reduction gearing whereby gear 22 rotates at a much slower speed than the wheel 16. Gear 22 is provided with a pin 23 which is adapted to strike and move counterclockwise an arm 24 which is in its path of rotation. Arm 24 extends upwardly from a sleeve 25 which oscillates on stud 26 secured to the spout 2. Sleeve 25 has a depending arm 27 which terminates in a catch or sear member 28 having a cooperating sear member 29 arranged on the outer end of a shaft 43 (Fig. 6) which pivotally supports the fork 14.

When the container 9 is tilted, ball 11 is held by fork 14 until the liquid flowing out of outlet 5 has caused wheel 16 to make enough turns so that pin 23 strikes arm 24 and rotates it counterclockwise against the action of hair spring 30 to release the sear 28, 29. Spring 30 is secured at one end to arm 24 and at the other end to a point 46 on a guard disk 44 adjustably fixed to stud 26 by screw 45. Thereupon the fork 14 pivots about the axis of shaft 43 and permits ball 11 to close on its seat 10 to shut off the flow of liquid. Thus a measured quantity of liquid is delivered, this quantity depending upon the size of the parts and the ratio of the gear train 19 to 22.

In practice it has been found preferable to move the gear train 19 to 22 by hand so that the stop 23 initially stands at the left side of the sear arm 24 when the parts are viewed as in Fig. 1. The flow is thus cut off shortly after the pin 23 has rocked the arm 24 and has passed to the left of it. The spring 30 urges the arm 24 in a clockwise direction and the sear member 28 is long enough to strike the sear member 29, the latter serving as a stop for the former. When the container 9 is moved to the upright position, the ball 11 strikes the fork 14 and causes it to swing counter-clockwise to the position shown in Fig. 1, whereby the sear 28, 29 again assumes the locked position shown in Fig. 1. Hence, the measuring device is automatically restored to its initial position as the container is moved from a pouring position to an upright position.

The base 7 is provided with a vent pipe 31 having a valve 32 which admits air into the container 9 to facilitate liquid flowing therefrom. The vent pipe 31 may have an extension 33 secured in the top of the base 7 and extending to a point adjacent the outlet 5. If desired, the vent extension 33 may be cast integral with the casing of spout 2, and in a position where it will not interfere with the operating parts of the device.

It has been found that faulty operation of the parts above described can be obtained, and a surplus of liquid poured, by intentionally tilting container 9 to an angle which is only slightly greater than horizontal, whereby liquid will trickle past the wheel 16 without accurately measuring the liquid. To prevent this, on the outlet side of the wheel 16, I provide a gravity operated valve 34 having a seat 35, this valve being normally closed when container 9 is upright as shown in Fig. 3. Valve 34 is pivotally mounted on a valve stem 36 connected to a lever 37, in turn connected to a link 38 having a slot 39 in which rides one end of a lever 40 pivoted intermediate its ends at 41 and having a weight 42 at its outer end. The parts just described are mounted on the back of spout 2 as seen in Fig. 1, in other words, on the side opposite from the gear train 19 to 22 and associated parts. When the spout 2 is in an upright position as shown in Fig. 4, the lever 40 extends downwardly, due to the action of weight 42, for example, at an angle of about 45 degrees, and in this position the upper end of lever 40 engages the upper end of slot 39 to push upwardly on link 38 and hold the valve 34 closed as shown in Fig. 4, to prevent dust or dirt from entering spout 2. When spout 2 is tilted in a clockwise direction as seen in Fig. 4, the weight 42 holds valve 34 closed until spout 2 has been tilted to a steep angle where weight 42 extends on the right hand side of the axis 41, whereupon the lever 40 swings in a clockwise direction with the outer end of lever 40 riding in slot 39 until it strikes the outer end of this slot with a sudden force, thereby jarring valve 34 open against the head of whatever liquid may be in the spout casing 2 at that time. Whatever initial turning of wheel 16 is caused by liquid flowing on top of valve 34 when it is closed, is of no consequence, as this rotation is not sufficient to trip the arm 24, and the same operation takes place each time the container 9 is tilted.

The device has been operated a number of times without the valve 34 and its associated parts which may be omitted and by tilting the device to roughly the same tilt angle, the device has been found to deliver the same measured quantity, such as a jigger-full each time, within the commercial limits.

The device has no operating parts which would become inoperative by reason of stickiness caused by evaporation of alcoholic liquors, and the device may be readily cleaned simply by pouring hot water through it. A suitable casing not shown may be arranged on the base 4 to cover the operating parts illustrated and described herein.

It will be apparent that various modifications may be made in the invention without departing from the spirit of the following claims.

I claim:

1. A measuring device for a tiltable spout, said device comprising a spout casing having a fluid passage therethrough, a metering device having an operating member in said passage, a valve in said passage, said valve having a stem outside of said casing, and gravity operated means outside of said casing depending upon and responsive to the angle of tilt of said casing for operating said stem and opening said valve only when said casing is tilted to a steep angle and for closing said valve when said casing is upright.

2. A measuring device comprising a casing having a spout having a fluid passage, a valve controlling said passage, means operated by flow through said passage for delaying the closing of said valve and gravity operated tilt angle responsive means outside of said casing for preventing fluid discharge from said spout until said spout is tilted to a steep angle.

3. A measuring device comprising a spout having a throat and an outlet with a rotatable wheel therebetween, a valve seat in said throat, a valve movable by gravity downwardly in said throat to close said seat when said spout is tilted, intercepting means in advance of said seat for intercepting said valve in its downward movement, and metering means controlled by said wheel for controlling said intercepting means.

4. A measuring device comprising a spout having a throat provided with two oppositely facing valve seats, a ball valve adapted to close one of said seats when the spout is upright and the other of said seats when the spout is tilted, and metering means controlling movement of said valve to its closed position when the spout is tilted.

5. A measuring device comprising a spout having a valve seat, a gravity operated valve movable to close said seat when the spout is tilted, a pivoted fork intercepting closing movement of said valve when the spout is tilted, a catch member on said fork, a cooperating catch member, means urging said cooperating catch member into locking engagement with said catch member on said fork, metering means controlling the operation of said cooperating catch member to release said fork, said fork being constructed and arranged to be operated by movement of said valve away from its seat to move the catch member on said fork in position to be engaged by said cooperating catch member.

6. A measuring device comprising a spout having a valve, a seat therefor, intercepting means in advance of said seat for restraining movement of said valve to its seat when the spout is tilted, measuring means operated by fluid flow through said spout, a sear between said last mentioned means and said intercepting means spring means tending to lock said sear, and a detent operated by said measuring means for unlocking said sear.

7. A measuring device comprising a spout having a throat and an outlet with a wheel therebetween, a gravity operated valve in said outlet movable to closed position when the spout is upright and movable to open position when the spout is tilted, a valve in said throat movable to closed position when the spout is upright to seal off inlet to said spout and movable to another closed position to seal off flow to said wheel at a certain time when the spout is tilted, and a metering device operated by flow through said spout for fixing said certain time, said first valve preventing operation of said metering device until said spout is tilted an amount sufficient to produce normal flow through said spout.

8. A measuring device comprising a spout having a metering device therein, and a gravity operated valve controlling discharge from said device and out said spout, gravity means for preventing discharge of leakage flow past said metering device and operable in response to the angle of tilt of said spout and operable only when the spout is tilted beyond a certain angle to open said valve and permit flow sufficient to normally operate said metering device, said gravity means comprising a loose connection permitting said gravity means, when sufficiently tilted, to operate independently of said valve and thereafter to apply a sudden force to open said valve.

ELDRED B. McGREAL.

REFERENCES CITED

The following references are of record in the file of this patent:

UNITED STATES PATENTS

| Number | Name | Date |
|---|---|---|
| 1,256,298 | Cremona | Feb. 12, 1918 |
| 451,129 | Miller | Apr. 28, 1891 |
| 975,958 | Johnson | Nov. 15, 1910 |
| 2,044,945 | Humbard | June 23, 1936 |
| 2,141,871 | Koukal | Dec. 27, 1938 |
| 849,564 | Overcash | Apr. 9, 1907 |
| 2,168,050 | Slipikas | Aug. 1, 1939 |
| 420,320 | Wagner | Jan. 28, 1890 |
| 1,857,627 | Elder | May 10, 1932 |

FOREIGN PATENTS

| Number | Country | Date |
|---|---|---|
| 536,615 | German | Oct. 24, 1931 |